(12) United States Patent
Takeuchi

(10) Patent No.: US 11,182,393 B2
(45) Date of Patent: Nov. 23, 2021

(54) SPATIAL DATA ANALYZER SUPPORT

(71) Applicant: INTERNATIONAL BUSINESS MACHINES CORPORATION, Armonk, NY (US)

(72) Inventor: Emiko Takeuchi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 15/437,796

(22) Filed: Feb. 21, 2017

(65) Prior Publication Data

US 2018/0239762 A1 Aug. 23, 2018

(51) Int. Cl.
*G06F 16/2457* (2019.01)
*G06F 16/29* (2019.01)
*G06F 16/248* (2019.01)
*G06Q 30/02* (2012.01)

(52) U.S. Cl.
CPC ...... *G06F 16/24578* (2019.01); *G06F 16/248* (2019.01); *G06F 16/29* (2019.01); *G06Q 30/0201* (2013.01)

(58) Field of Classification Search
CPC ... G06F 16/24578; G06F 16/248; G06F 16/29
USPC .......................................................... 707/723
See application file for complete search history.

(56) References Cited

U.S. PATENT DOCUMENTS

| | | | | |
|---|---|---|---|---|
| 5,771,169 A | * | 6/1998 | Wendte | A01B 79/005 702/5 |
| 6,684,219 B1 | * | 1/2004 | Shaw | G06F 16/289 |
| 6,732,120 B1 | * | 5/2004 | Du | G01C 21/20 715/764 |
| 8,015,183 B2 | * | 9/2011 | Frank | G06F 16/29 707/724 |
| 8,799,004 B2 | | 8/2014 | Bishop, III et al. | |
| 9,552,412 B1 | * | 1/2017 | Lowe | G06F 16/93 |
| 9,746,985 B1 | * | 8/2017 | Humayun | G06Q 10/10 |

(Continued)

OTHER PUBLICATIONS

Yzaguirre et al., "Newspaper archives + text mining = rich sources of historical geo-spatial data", 2016, IOP Conf. Series, 9 pages. (Year: 2016).*

(Continued)

*Primary Examiner* — Tony Mahmoudi
*Assistant Examiner* — Michael Le
(74) *Attorney, Agent, or Firm* — Michael O'Keefe

(57) ABSTRACT

A method, computer system, and a computer program product for data analysis using a plurality of map data is provided. The present invention may include generating recommendation data from a plurality of corpus data. The present invention may include receiving a user region corresponding to a geographic area. The present invention may include determining a plurality of nouns from the recommendation data. The present invention may include presenting the plurality of nouns to a user. The present invention may include receiving a plurality of predictor variables. The present invention may include determining a plurality of target variables based on the predictor variables. The present invention may include determining a weight for each predictor variable based on the plurality of target variables. The present invention may include presenting the plurality of predictor variables and the weight of each predictor variable to the user.

17 Claims, 7 Drawing Sheets

(56) References Cited

U.S. PATENT DOCUMENTS

| | | | |
|---|---|---|---|
| 2002/0078035 A1* | 6/2002 | Frank | G06F 16/29 |
| 2003/0200192 A1* | 10/2003 | Bell | G06F 16/9537 |
| 2005/0197992 A1* | 9/2005 | Kipersztok | G06F 40/30 |
| | | | 706/50 |
| 2006/0015486 A1* | 1/2006 | Nomiyama | G06F 16/33 |
| 2007/0135991 A1* | 6/2007 | Riise | G06Q 30/0261 |
| | | | 455/456.1 |
| 2007/0143345 A1* | 6/2007 | Jones | G06F 16/288 |
| 2009/0132469 A1* | 5/2009 | White | G06Q 10/00 |
| 2009/0265230 A1* | 10/2009 | Plachouras | G06Q 30/0256 |
| | | | 705/14.54 |
| 2009/0300528 A1* | 12/2009 | Stambaugh | G06F 16/9537 |
| | | | 715/764 |
| 2010/0153324 A1* | 6/2010 | Downs | G06F 40/258 |
| | | | 706/21 |
| 2011/0166788 A1* | 7/2011 | Griffin | A01B 79/005 |
| | | | 702/5 |
| 2012/0054174 A1* | 3/2012 | Gagnier | G06F 16/29 |
| | | | 707/714 |
| 2014/0032567 A1* | 1/2014 | Assadollahi | G06F 16/3347 |
| | | | 707/742 |
| 2014/0310162 A1 | 10/2014 | Collins | |
| 2015/0356183 A1* | 12/2015 | Green | G06Q 50/01 |
| | | | 707/724 |
| 2016/0299955 A1* | 10/2016 | Jain | G06F 16/313 |

OTHER PUBLICATIONS

Mell et al., "The NIST Definition of Cloud Computing," National Institute of Standards and Technology, Sep. 2011, p. 1-3, Special Publication 800-145.

\* cited by examiner

SPATIAL DATA ANALYZER SUPPORT

BACKGROUND

The present invention relates generally to the field of computing, and more particularly to spatial analytics.

When map information is used to analyze information regarding an accident or other geographical event, the range of analysis may be specified depending upon existing definitions, such as government borders. Similarity between accidents may be already known to individual persons in charge of accident analysis, for example, by the fact that accidents tend to be concentrated in a specific area.

SUMMARY

Embodiments of the present invention disclose a method, computer system, and a computer program product for data analysis using a plurality of map data. The present invention may include generating recommendation data from a plurality of corpus data. The present invention may also include receiving a user region corresponding to a geographic area. The present invention may then include determining a plurality of nouns from the generated recommendation data based on the received user region. The present invention may further include presenting the determined plurality of nouns to a user. The present invention may also include, in response to presenting the determined plurality of nouns to the user, receiving a plurality of predictor variables. The present invention may then include determining a plurality of target variables based on the received plurality of predictor variables and the generated recommendation data. The present invention may further include determining a weight for each predictor variable within the plurality of predictor variables based on the determined plurality of target variables. The present invention may also include presenting the plurality of predictor variables and the determined weight of each predictor variable to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
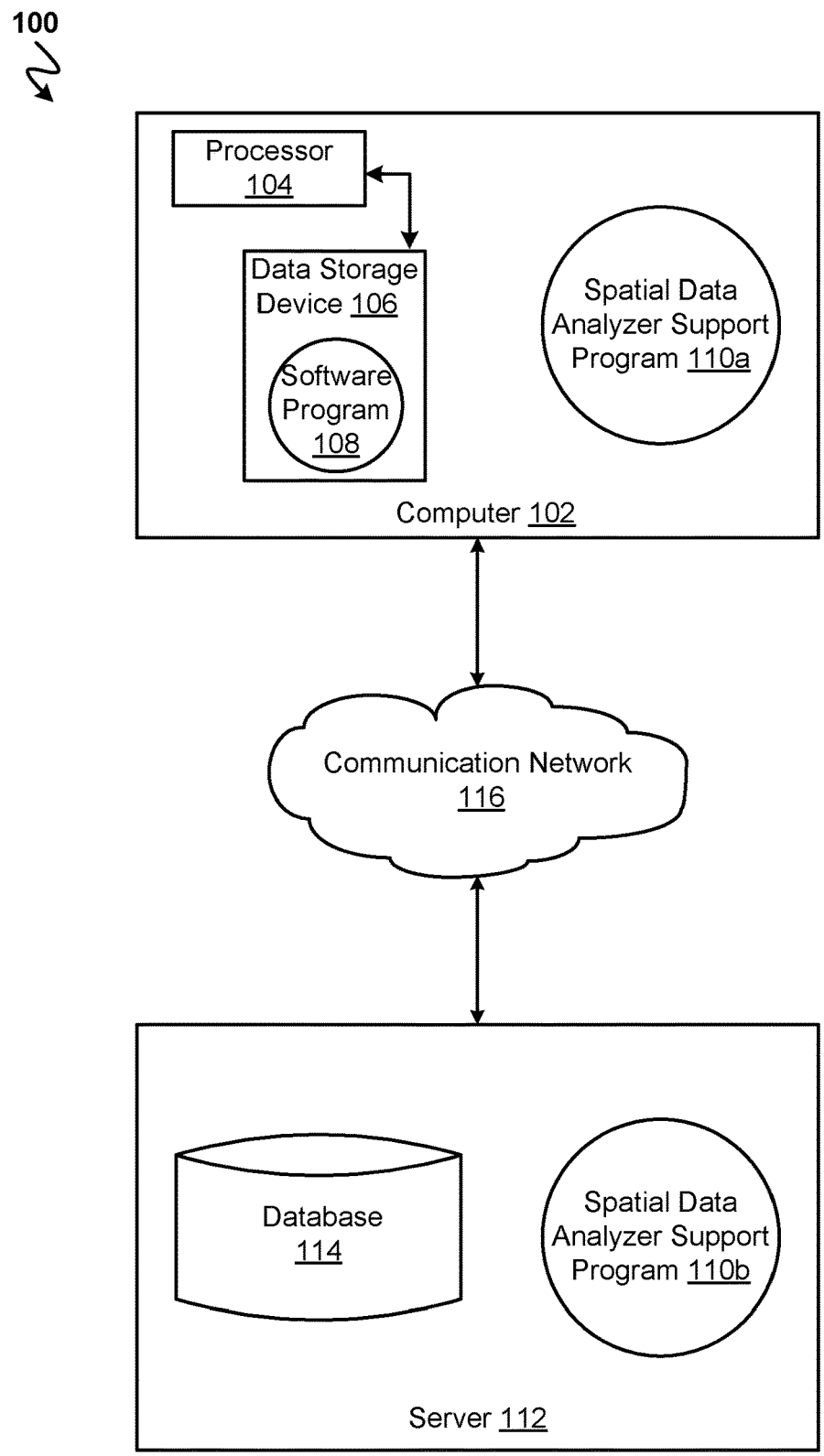
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described previously, when map information is used to analyze information regarding an accident or the like, the range of analysis may be specified depending upon existing definitions, such as government borders. Similarity between accidents may be already known to individual persons in charge of accident analysis, for example, by the fact that accidents tend to be concentrated in a specific area. This may mean that there is a need to define a specific area on a case-by-case basis to ensure the analysis is carried out within a relevant geographic area.

Therefore, it may be advantageous to, among other things, provide a way to define geographical regions for spatial analysis to identify conditions consistent with similar accidents through cross-sectional representation of information, thereby facilitating recognition by analysts of the tendencies of location and regional characteristics through visual delimitation of the analysis area.

The following described exemplary embodiments provide a system, method and program product for spatial data analyzer support. As such, the present embodiment has the capacity to improve the technical field of spatial analytics by allowing an analyst to define a geographical area and identify data specific to the defined geographical area. More specifically, recommendation data may be generated from various sources. Then, a user-defined target geographic area may be received. Metadata matching the target geographic area may be identified within the recommendation data and presented to the user or analyst. The user may then select specific items within the metadata for analysis. Data related to the selected items may be located and analyzed. Thereafter, the results of the analysis may be presented to the user.

According to at least one embodiment, an existing corpus of data and a user-defined target geographical area may be used as the basis for spatial analysis. Existing data may include recommendation data, data to be analyzed, and data items serving as target variables associated with a predicted event. Recommendation data may include pieces of data for displaying items for analysis which may be recommended on a per-specific-region basis. Recommendation data may be derived from text articles, from social networking services, or other internet resources. Furthermore, recommendation data may include positional information associated with the internet-sourced data, such as the geographical coverage of a local newspaper or city government. Data to be analyzed may include position information associated with each piece of data and may be stored along with the data. The data to be analyzed may include terrain data, meteorological data, accident information, and the like. Other data, such as data disclosed by regional administrative organizations may also be used as data to be analyzed. Data items serving as target variables associated with a predicted event, such as causes of accidents in the case of accident analysis, may also be identified and stored. Finally, a user-defined target geographic region may be utilized, such as longitude and latitude coordinate data defining a polygon for analysis.

Spatial analysis may begin with generating recommendation data. The entered textual data may be subjected to known morphological analysis to identify the nouns and the frequency of occurrence for each noun may be computed. Then the user may draw a line on a map displayed on a screen demarcating a geographical area to be analyzed. The line may be drawn to create a closed shape. Thereafter, continuous position information may be sent to a system. The system may define a polygon based on the user-drawn line. Next, information matching the noun data determined previously may be searched to identify nouns that frequently appear within the regions that fall at least partially within the user-defined polygon. Nouns may be filtered using a predefined occurrence frequency threshold to focus on nouns that exceed the threshold. The identified nouns and the frequency of occurrence may then be displayed to the user. The user may then select one or more nouns for analysis. Training may be performed based on the user-selected nouns to derive target variables and weights of individual predictor variables may be computed based on a statistical methodology. Analysis of target variables and predictor variables may be restricted to data occurring within the user-defined polygon. However, certain data, such as meteorological data and data from administrative units, may be used if occurring in areas beyond the user-defined polygon. After the analysis completes, the roles of individual predictor variables within the polygon may be presented to the user. The predictor variables may be displayed along with the text from the original recommendation data documents allowing the user to confirm the analysis.

When the pieces of data are subjected to training, the predictor variables may be optimized for the whole set of target variables. As a result, regional differences may not influence the weighting of the predictor variables. Instantaneous definition of a range of training may be used to recognize the approximate area characteristics for more fine-tuned data mining that may take the geographical region into account. Furthermore, the present embodiment may lead to less user frustration for certain types of business where existing boundaries, such as municipalities, roads, and railroads may have less significance, by performing spatial data analysis through dynamically defining a target geographical area.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a spatial data analyzer support program 110a. The networked computer environment 100 may also include a server 112 that is enabled to run a spatial data analyzer support program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the spatial data analyzer support program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the spatial data analyzer support program 110a, 110b (respectively) to analyze predictive data associated with a user-defined geographic area and present analysis results to the user. The spatial data analyzer support method is explained in more detail below with respect to FIGS. 2-4.

Figure 2:
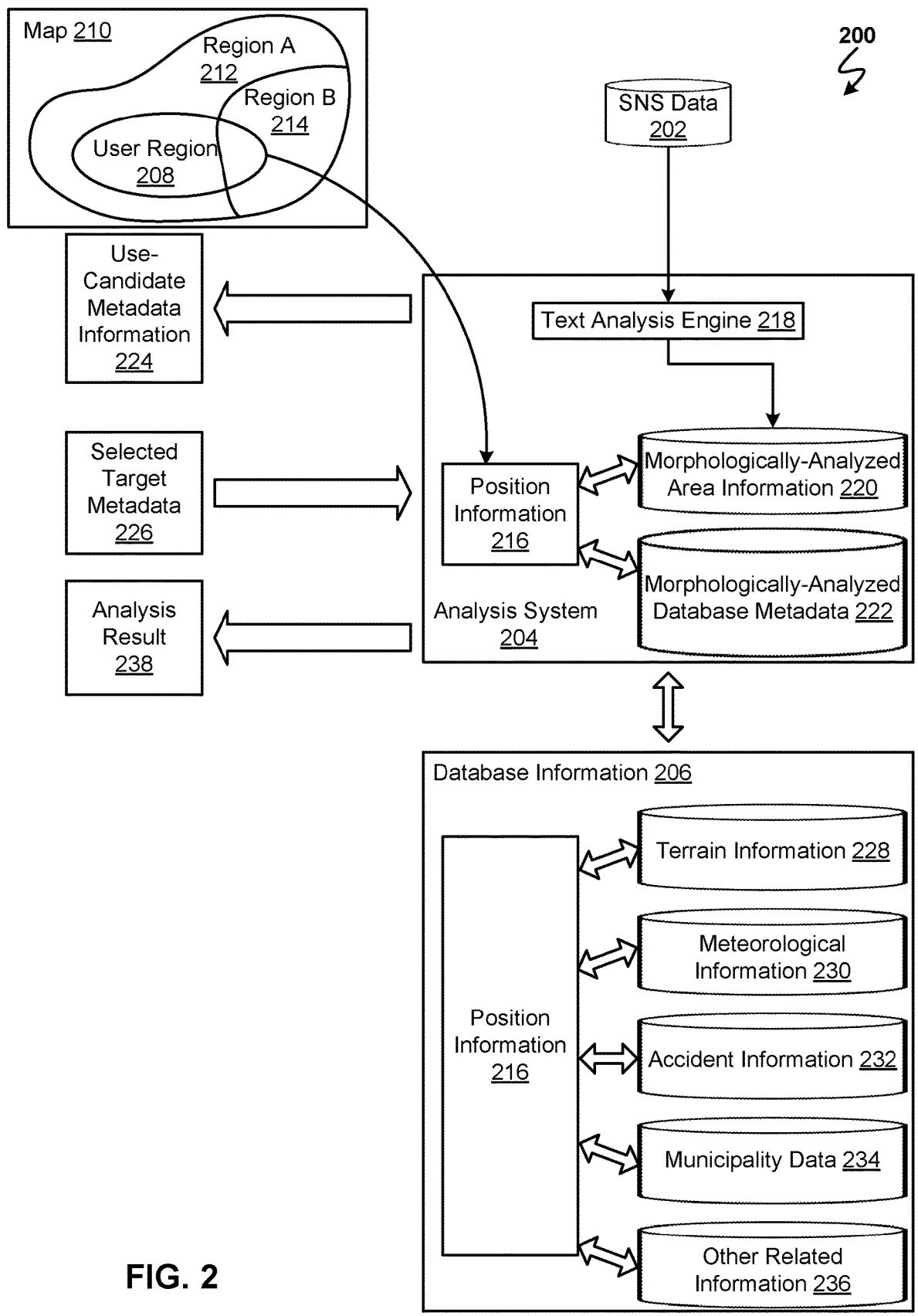
FIG. 2 is a block diagram of the spatial data analyzer support architecture according to at least one embodiment.

Referring now to FIG. 2, a block diagram of the spatial data analyzer support architecture 200 according to at least one embodiment is depicted. The spatial data analyzer support architecture 200 may include social network service (SNS) data 202 (i.e., corpus data), an analysis system 204, and database information 206.

According to at least one embodiment, a user may draw a line demarking a user region 208 on a map 210 including one or more established regions, such as region A 212 and region B 214 shown. For example, a map 210 may be displayed on a touchscreen and a user may draw a closed shape using a finger on the touchscreen indicating the user region 208. The user may select a user region 208 encompassing parts of region A 212 and region B 214. Region A 212 and region B 214 may indicate city limits, school districts, property boundaries, and other existing geographic borders. According to at least one embodiment, if the user does not draw a closed shape, for example the start and end points of the line drawn by the user do not meet, then the start and end points may be joined by automatically extending the end point in a straight line to the start point. According to at least one other embodiment, the shape drawn by the user may be analyzed and the closest matching shape from a library of known shapes may be used in place of the what the user drew and the user may be prompted to verify the shape is correct. According to yet another embodiment, the user may see the line drawn on screen in real-time and the user may select anchor points along the line and move the anchor points to adjust the shape of the user region 208 until the user indicates the user region 208 is correct. Once the user region 208 is defined by the user, the user region 208 may be translated into a set of map coordinates corresponding to the border indicated by the user region 208 as position information 216. From the position information 216, the analysis system 204 may define a polygon.

Using SNS data 202 compiled previously containing information associated with geographic areas (e.g., region A 212), the text analysis engine 218 within the analysis system 204 may analyze the SNS data 202 to identify nouns and generate a database 114 containing morphologically-analyzed area information 220. A feature noun or nouns may be searched for within the user region 208 based on using the position information 216 together with the morphologically-analyzed area information 220. The resulting feature noun(s) and corresponding morphologically-analyzed database metadata 222 may be presented to the user as use-candidate metadata information 224. The use-candidate metadata information 224 may include base analysis information and area-specific information. For example, base analysis information may include monthly average temperature, monthly average maximum temperature, and monthly average minimum temperature. Area-specific information may include population density information, daily maximum wind speed, and so on. The use-candidate metadata information 224 may be displayed to the user as a list of nouns and the frequency of occurrence of each noun. Thereafter, input from the user selecting target metadata from the displayed list nouns may generate selected target metadata 226. The user may select metadata (i.e., predictor variables) from the displayed list using a finger tap on a touchscreen, a mouse, a keyboard, or other input method. Once the selected target metadata 226 has been generated, the selected target metadata 226 may be transmitted to the analysis system 204 for processing.

After receipt of the selected target metadata 226, the analysis system 204 performs training based on the selected target metadata 226 to derive target variables. Furthermore, the weights of individual predictor variables may be computed based on statistical analysis as will be described in further detail below with respect to FIG. 3. The target variables and the weight of predictor variables may be computed based off data that geographically originates within the user region 208. However, some data, such as meteorological data and data from administrative units, may be used when the data covers areas beyond the user region 208 if the geographical range covered by the data overlaps the user region 208. For example, meteorological data for region A 212 may be used since region A 212 overlaps, in part, the user region 208. Data corresponding to the selected target metadata 226 may be searched for within database information 206 and filtered or compared with the position information 216 defining the user region 208. Database information 206 may include multiple databases 114, such as a terrain information 228, meteorological information 230, accident information 232, municipality data 234, and other related information 236.

After the user-selected metadata is found and filtered based on the position information 216, the roles of individual predictor variables may be dynamically presented to the user as an analysis result 238. The analysis result 238 may also display the original text documents that contained the information corresponding to the metadata the user selected for the user to review and confirm the original data of the analysis result 238. An example analysis result 238 is described in further detail below with respect to FIG. 4.

Figure 3:
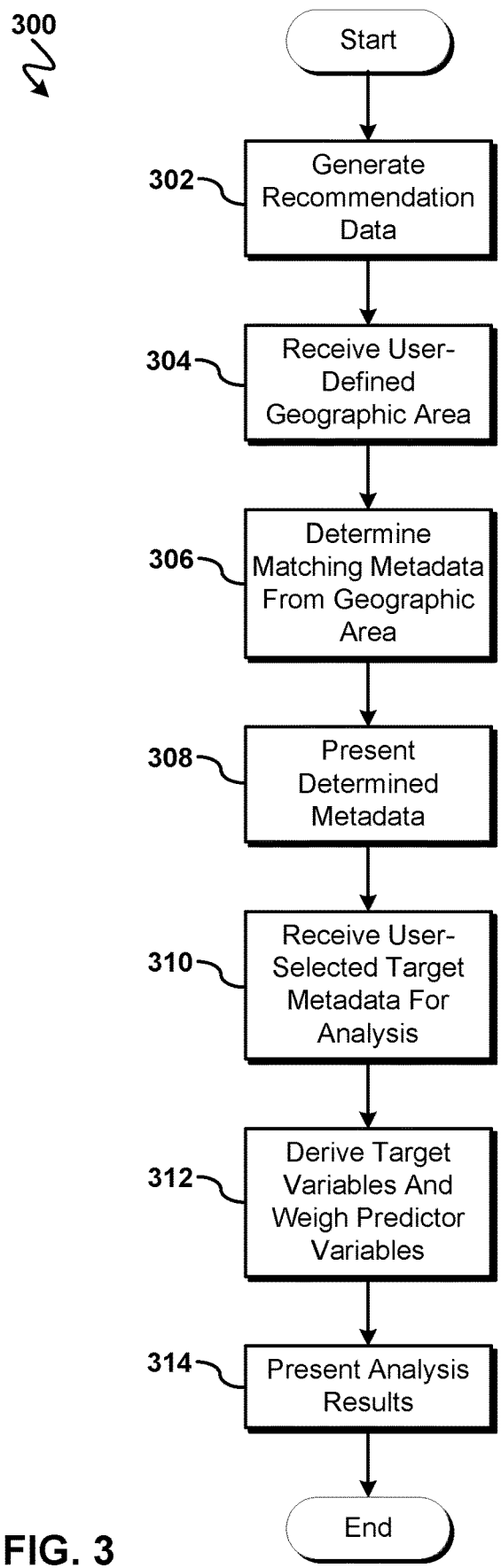
FIG. 3 is an operational flowchart illustrating a process for spatial data analyzer support according to at least one embodiment.

Referring now to FIG. 3, an operational flowchart illustrating the exemplary spatial data analyzer support process 300 used by the spatial data analyzer support program 110a and 110b according to at least one embodiment is depicted.

At 302, recommendation data is generated. SNS data 202 and other textual data may be subjected to morphological analysis using the text analysis engine 218 of the analysis system 204. The nouns identified from the SNS data 202 and the frequency with which the identified nouns occur may be computed. The morphologically analyzed information may be stored in the morphologically-analyzed area information 220 database for area-related data. The morphologically-analyzed database metadata 222 database may store database-related information from the databases 228-236 within the database information 206. The morphologically-analyzed database metadata 222 database may contain table names, descriptions of the tables, column names, and text descriptions of the columns.

Next, at 304, A user-defined geographic area is received. The user-defined geographic area or user region 208 may be generated through user interaction, such as the user drawing a line on a touchscreen displaying a map 210, as described previously. The geographic coordinates corresponding with the line the user drew may be determined in relation to the map 210 displayed using known methods. For example, if the map 210 displayed to the user shows region A 212 and region B 214, the user may draw an ellipse indicating user region 208. The user region 208 may then be translated into a set of geographic coordinates as position information 216 describing a polygon.

Then, at 306, matching metadata from the user-defined geographic area is determined. As described previously, position information 216 together with the morphologically-analyzed area information 220 may be used to retrieve metadata from the morphologically-analyzed database metadata 222 database for noun data originating in geographic locations within the user region 208. For example, if region A 212 and region B 214 represent an administrative unit and the user defines user region 208, then the corresponding metadata is searched for using feature nouns (i.e., characteristic nouns) found in data from region A 212 and region B 214. Feature nouns from region A 212 and region B 214 may include "population," "tornado," "derby," "football," and "heatstroke." Once the feature nouns have been identified, then the metadata is queried for available data from the morphologically-analyzed database metadata 222. Thereafter, tables of metadata items matching the feature nouns that have location data corresponding with the user region 208 may be returned. Furthermore, the frequency of occurrence for the nouns may also be returned.

At 308, the matching metadata determined at 306 is presented to the user. Nouns found and the corresponding number of occurrences for each noun may be presented to the user as a user interface displaying the use-candidate metadata information 224 as described previously.

Next, at 310, selected target metadata 226 selected by the user for analysis is received. The selected target metadata 226 may be selected by the user in response to the use-candidate metadata information 224 presented previously at 308. The user may select target metadata (i.e., predictor variables) for analysis, for example, by touching nouns displayed on a list or through other input methods. Once the user completes metadata selection, the selected metadata may be received as selected target metadata 226.

Then, at 312, target variables are derived and the weights of predictor variables are computed. Training may be performed on the received selected target metadata 226, including predictor variables, to derive a set of target variables. Target variables, for example in the case of accident analysis, may indicate causes of accidents, such as damaged rail in a subway. For each predictor variable, a determination may be made regarding the relationship between the values a predictor variable may assume and the target variables by performing a chi-square test. The probability that P(X≥x) results are obtained may be computed with the chi-square value and a degree of freedom (m−1)(n−1) used as inputs. Then, the target variables are returned to the user starting from the target variable that has the smallest P value. The following table illustrates an example of a predictor variable values when the predictor variable is a daily minimum temperature.

|  |  | Predictor Variable Values (Daily Minimum Temperature) | | | | |
|---|---|---|---|---|---|---|
|  |  | 0-3° C | 4-5° C | 5-8° C | >8° C. | Total |
| Target Variables | Damaged Rail | 35 | 2 | 10 | 13 | 60 |
|  | Broken Wire | 1 | 3 | 0 | 5 | 9 |
|  | ... | ... | ... | ... | ... | ... |
|  | Total |  | a1 | a2 | a3 | a4 | 200 |

The chi-square value calculation for the above daily minimum temperature may be done using the following formula:

$$X^2 = \frac{\left(35 - \left(a1 \times \frac{60}{200}\right)\right)^2}{a1 \times \frac{60}{200}} + \frac{\left(2 - \left(a2 \times \frac{60}{200}\right)\right)^2}{a2 \times \frac{60}{200}} + \ldots + \frac{\left(1 - \left(a1 \times \frac{9}{200}\right)\right)^2}{a1 \times \frac{9}{200}} + \ldots$$

In the same manner, the chi-squared values may be calculated for each remaining predictor variable. Predictor variables may be ordered starting from the value with the probability obtained from the chi-square value and degree of freedom (3×(the number of target variable variations−1)) that is the smallest to the largest.

At 314, the analysis result 238 is presented to the user. The analysis result 238 may present the user with the ordered predictor variables and related information as will be described below with respect to FIG. 4.

Figure 4:
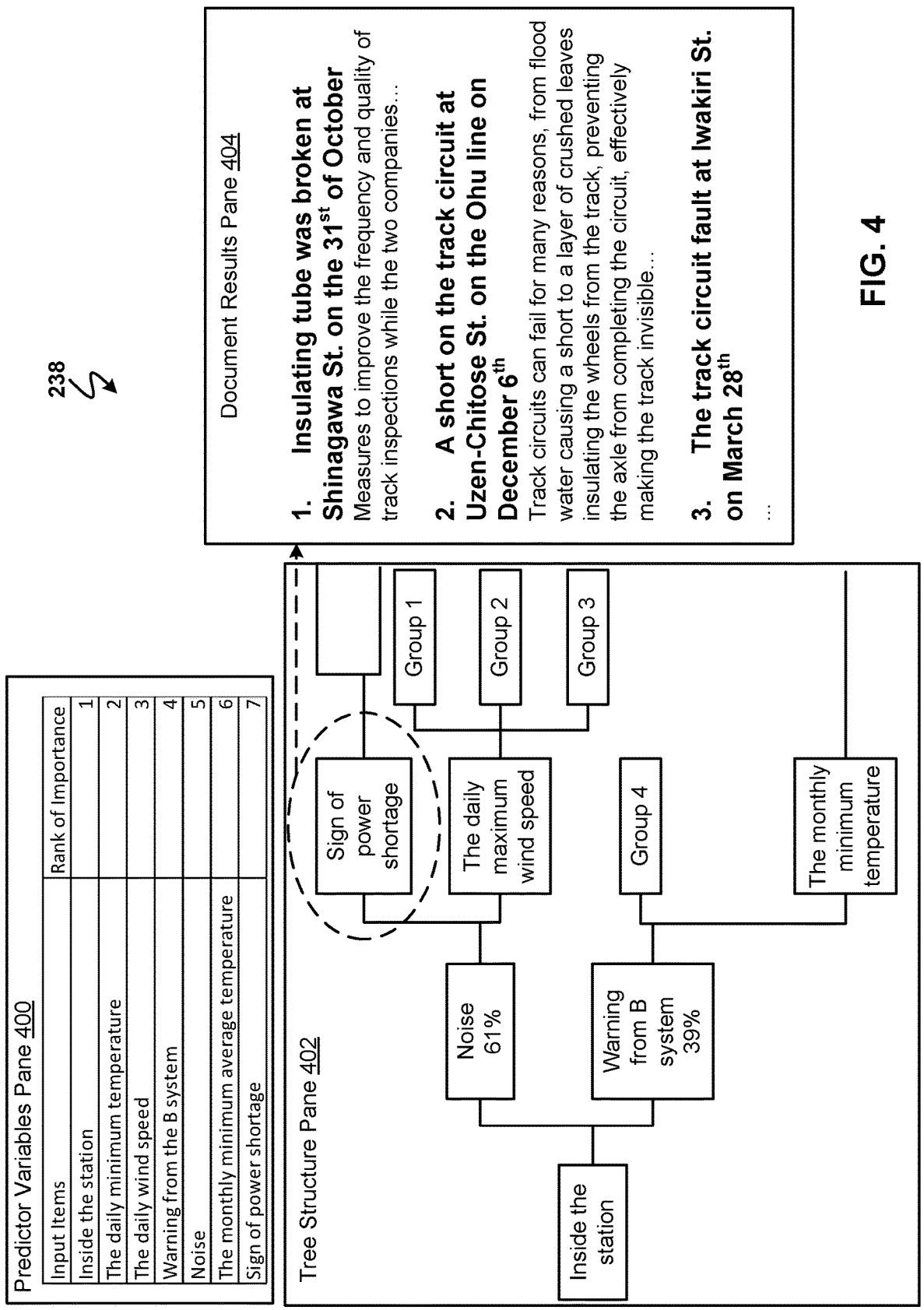
FIG. 4 illustrates an exemplary analysis result display according to at least one embodiment.

Referring now to FIG. 4, an exemplary analysis result 238 display according to at least one embodiment is depicted. The displayed analysis result 238 may include displaying a list of predictor variables in a predictor variable pane 400 ordered as described previously including the rank of importance. Additionally, the displayed analysis result 238 may include displaying a hierarchical tree structure illustrating the relationship between the predictor variables 400 in a tree structure pane 402 and a document results pane 404 may display the text of documents containing the data related to a predictor variable, such as the sign of power outage predictor variable.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
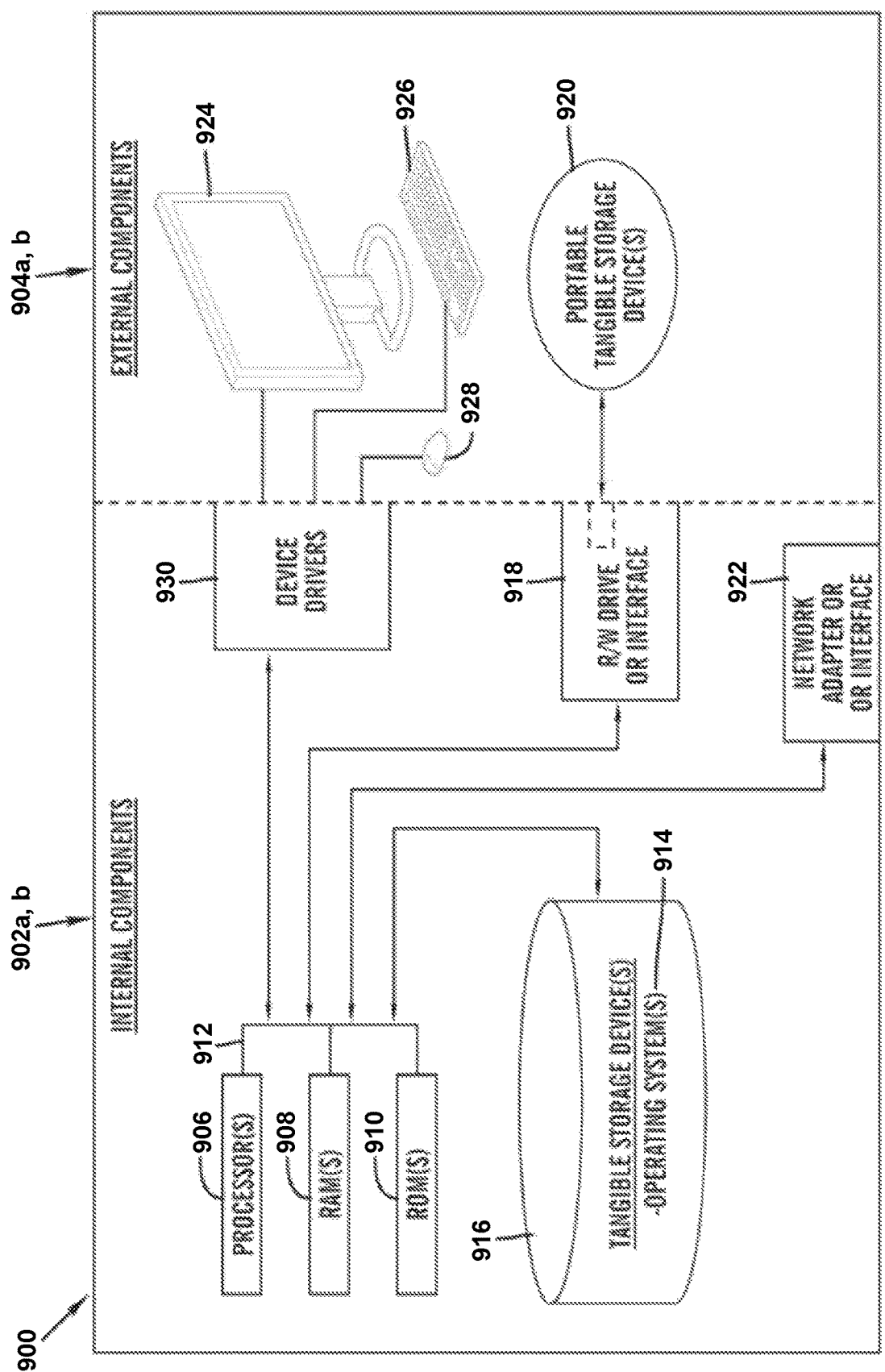
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the spatial data analyzer support program 110a in client computer 102, and the spatial data analyzer support program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the spatial data analyzer support program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the spatial data analyzer support program 110a in client computer 102 and the spatial data analyzer support program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the spatial data analyzer support program 110a in client computer 102 and the spatial data analyzer support program 110b in network server computer 112 are loaded into the respective hard drive 916. The network may comprise copper wires, optical fibers, wireless transmission, routers, firewalls, switches, gateway computers and/or edge servers.

Each of the sets of external components 904*a, b* can include a computer display monitor 924, a keyboard 926, and a computer mouse 928. External components 904*a, b* can also include touch screens, virtual keyboards, touch pads, pointing devices, and other human interface devices. Each of the sets of internal components 902*a, b* also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
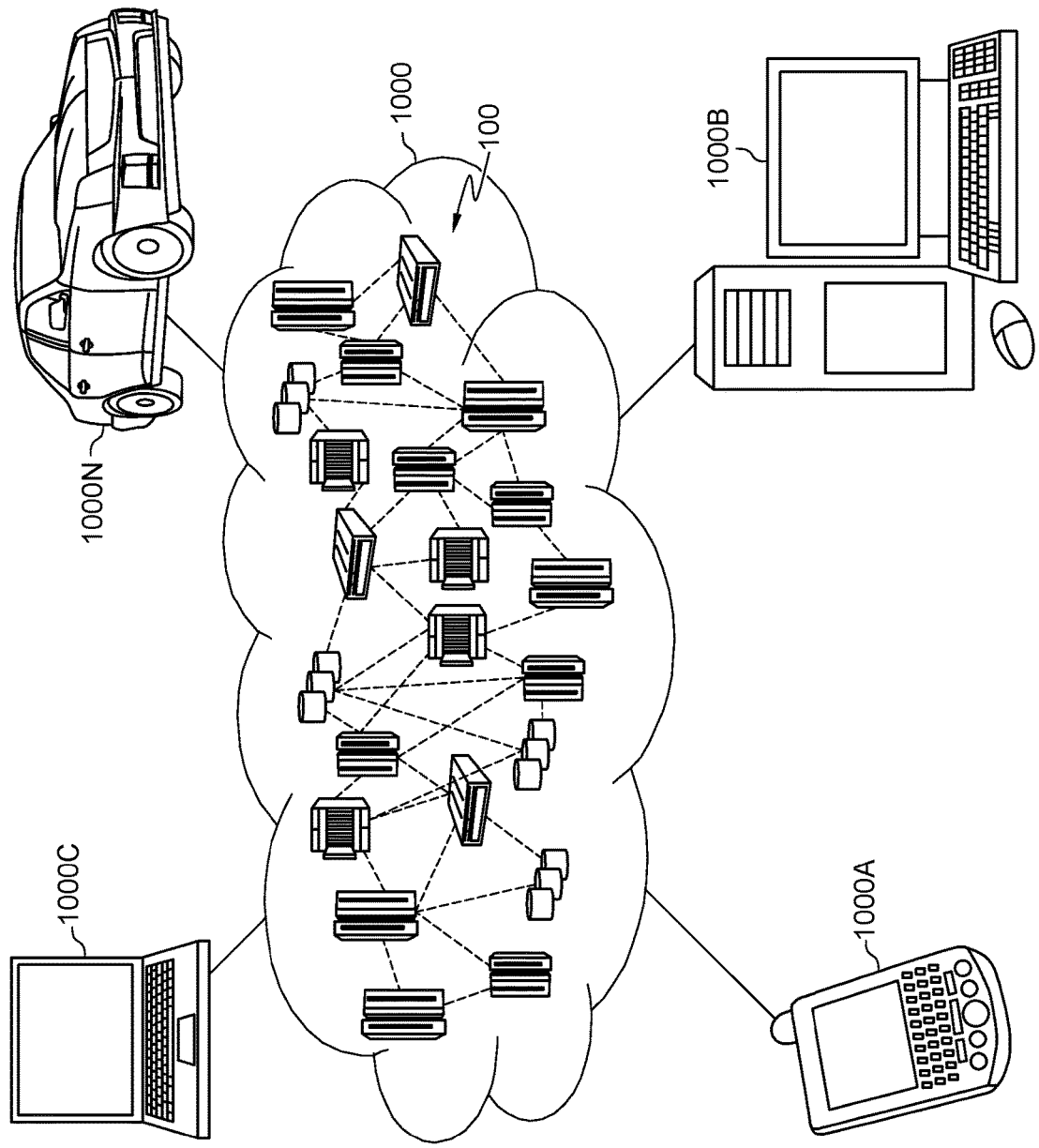
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
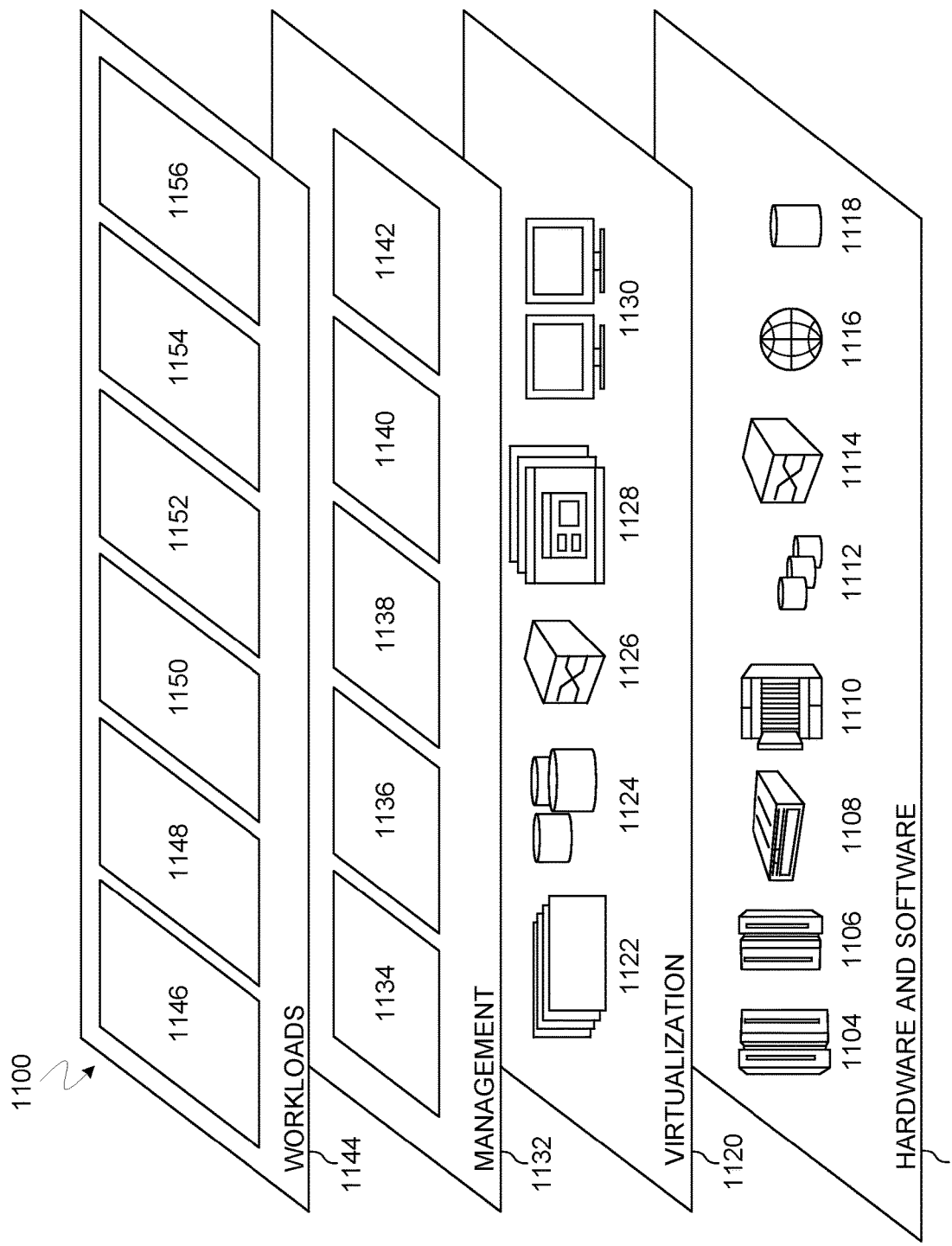
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and spatial data analyzer support 1156. A spatial data analyzer support program 110a, 110b provides a way to analyze predictive data associated with a user-defined geographic area and present analysis results to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data analysis using a plurality of map data, the method comprising:

generating recommendation data from a plurality of corpus data;

displaying, on a device screen, a map to a user;

in response to the user selecting a user region from the displayed map, receiving the user region corresponding to a geographic area of the displayed map, wherein the user selecting the user region comprises the user drawing a closed shape within the displayed map indicating the user region;

determining a plurality of nouns from the generated recommendation data based on the received user region;

presenting the determined plurality of nouns to a user;

in response to presenting the determined plurality of nouns to the user, receiving a plurality of predictor variables;

determining a plurality of target variables based on the received plurality of predictor variables and the generated recommendation data;

determining a weight for each predictor variable within the plurality of predictor variables based on the determined plurality of target variables; and presenting the plurality of predictor variables as a list of predictor variables together with the determined weight of each predictor variable to the user, wherein the presented plurality of predictor variables is also displayed in a hierarchical tree structure illustrating relationships between the plurality of predictor variables, wherein presenting the plurality of predictor variables and the determined weight of each predictor variable to the user further comprises displaying a text portion from at least one text document simultaneously with the presented list of predictor variables and the hierarchical tree structure, and wherein the displayed text portion contains text data related to at least one predictor variable of the plurality of predictor variables.

2. The method of claim 1, wherein generating the recommendation data from the plurality of corpus data comprises performing morphological analysis on the plurality of corpus data.

3. The method of claim 1, wherein determining the plurality of nouns from the generated recommendation data based on the received user region comprises searching the generated recommendation data for a plurality of frequently occurring nouns associated with the received user region and filtering the plurality of frequently occurring nouns based on a threshold to determine the plurality of nouns.

4. The method of claim 1, wherein presenting the determined plurality of nouns to the user comprises displaying a number of occurrences corresponding to each noun within the plurality of nouns.

5. The method of claim 1, wherein determining the weight for each predictor variable within the plurality of predictor variables based on the determined plurality of target variables comprises calculating a chi-square value for each predictor variable within the plurality of predictor variables.

6. The method of claim 1, wherein the plurality of corpus data is selected from the group consisting of a plurality of terrain information, a plurality of meteorological information, and a plurality of accident information.

7. A computer system for data analysis using a plurality of map data, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system performs a method comprising:

generating recommendation data from a plurality of corpus data;

displaying, on a device screen, a map to a user;

in response to the user selecting a user region from the displayed map, receiving the user region corresponding to a geographic area of the displayed map, wherein the user selecting the user region comprises the user drawing a closed shape within the displayed map indicating the user region;

determining a plurality of nouns from the generated recommendation data based on the received user region;

presenting the determined plurality of nouns to a user;

in response to presenting the determined plurality of nouns to the user, receiving a plurality of predictor variables;

determining a plurality of target variables based on the received plurality of predictor variables and the generated recommendation data;

determining a weight for each predictor variable within the plurality of predictor variables based on the determined plurality of target variables; and presenting the plurality of predictor variables as a list of predictor variables together with the determined weight of each predictor variable to the user, wherein the presented plurality of predictor variables is also displayed in a hierarchical tree structure illustrating relationships between the plurality of predictor variables, wherein presenting the plurality of predictor variables and the determined weight of each predictor variable to the user further comprises displaying a text portion from at least one text document simultaneously with the presented list of predictor variables and the hierarchical tree structure, and wherein the displayed text portion contains text data related to at least one predictor variable of the plurality of predictor variables.

8. The computer system of claim 7, wherein generating the recommendation data from the plurality of corpus data comprises performing morphological analysis on the plurality of corpus data.

9. The computer system of claim 7, wherein determining the plurality of nouns from the generated recommendation data based on the received user region comprises searching the generated recommendation data for a plurality of frequently occurring nouns associated with the received user region and filtering the plurality of frequently occurring nouns based on a threshold to determine the plurality of nouns.

10. The computer system of claim 7, wherein presenting the determined plurality of nouns to the user comprises displaying a number of occurrences corresponding to each noun within the plurality of nouns.

11. The computer system of claim 7, wherein determining the weight for each predictor variable within the plurality of predictor variables based on the determined plurality of target variables comprises calculating a chi-square value for each predictor variable within the plurality of predictor variables.

12. The computer system of claim 7, wherein the plurality of corpus data is selected from the group consisting of a plurality of terrain information, a plurality of meteorological information, and a plurality of accident information.

13. A computer program product for data analysis using a plurality of map data, comprising:

one or more computer-readable storage media and program instructions stored on at least one of the one or more computer-readable storage media, the program instructions executable by a processor, the program instructions comprising:

program instructions to generate recommendation data from a plurality of corpus data;

program instructions to display, on a device screen, a map to a user;

in response to the user selecting a user region from the displayed map, program instructions to receive the user region corresponding to a geographic area of the displayed map, wherein the user selecting the user region comprises the user drawing a closed shape within the displayed map indicating the user region;

program instructions to determine a plurality of nouns from the generated recommendation data based on the received user region;

program instructions to present the determined plurality of nouns to a user;

program instructions to, in response to presenting the determined plurality of nouns to the user, receive a plurality of predictor variables;

program instructions to determine a plurality of target variables based on the received plurality of predictor variables and the generated recommendation data;

program instructions to determine a weight for each predictor variable within the plurality of predictor variables based on the determined plurality of target variables; and program instructions to present the plurality of predictor variables as a list of predictor variables together with the determined weight of each predictor variable to the user, wherein the presented plurality of predictor variables is also displayed in a hierarchical tree structure illustrating relationships between the plurality of predictor variables, wherein presenting the plurality of predictor variables and the determined weight of each predictor variable to the user further comprises displaying a text portion from at least one text document simultaneously with the presented list of predictor variables and the hierarchical tree structure, and wherein the displayed text portion contains text data related to at least one predictor variable of the plurality of predictor variables.

14. The computer program product of claim 13, wherein generating the recommendation data from the plurality of corpus data comprises performing morphological analysis on the plurality of corpus data.

15. The computer program product of claim 13, wherein determining the plurality of nouns from the generated recommendation data based on the received user region comprises searching the generated recommendation data for a plurality of frequently occurring nouns associated with the received user region and filtering the plurality of frequently occurring nouns based on a threshold to determine the plurality of nouns.

16. The computer program product of claim 13, wherein presenting the determined plurality of nouns to the user comprises displaying a number of occurrences corresponding to each noun within the plurality of nouns.

17. The computer program product of claim 13, wherein determining the weight for each predictor variable within the plurality of predictor variables based on the determined plurality of target variables comprises calculating a chi-square value for each predictor variable within the plurality of predictor variables.

\* \* \* \* \*